United States Patent
Fix et al.

(10) Patent No.: US 9,356,713 B2
(45) Date of Patent: *May 31, 2016

(54) DETECTION OF FAULTY RADIO OSCILLATOR OR FAULTY MOBILE TIMING MEASUREMENTS

(71) Applicant: AT&T Mobility II LLC, Atlanta, GA (US)

(72) Inventors: Jeremy Fix, Acworth, GA (US); Mario Kosseifi, Roswell, GA (US); Sheldon Kent Meredith, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,484

(22) Filed: Oct. 12, 2015

(65) Prior Publication Data

US 2016/0036539 A1 Feb. 4, 2016

Related U.S. Application Data

(63) Continuation of application No. 14/616,596, filed on Feb. 6, 2015, now Pat. No. 9,191,849, which is a continuation of application No. 13/537,690, filed on Jun. 29, 2012, now Pat. No. 8,989,730.

(51) Int. Cl.
H04B 17/29 (2015.01)

(52) U.S. Cl.
CPC ...................................... *H04B 17/29* (2015.01)

(58) Field of Classification Search
CPC ..... H04W 24/08; H04W 88/08; H04W 24/04; H04B 17/29
See application file for complete search history.

(56) References Cited

U.S. PATENT DOCUMENTS

| | | | |
|---|---|---|---|
| 6,194,970 B1 | 2/2001 | Nielsen et al. | |
| 6,684,086 B2 | 1/2004 | Miya | |
| 6,771,934 B2 * | 8/2004 | Demers | H04B 1/7107 375/148 |
| 7,443,253 B2 | 10/2008 | Chen | |
| 7,529,551 B2 | 5/2009 | Tanaka et al. | |
| 8,509,806 B2 * | 8/2013 | West | G01S 5/00 455/456.1 |
| 9,191,849 B2 * | 11/2015 | Fix | H04W 24/04 |

(Continued)

OTHER PUBLICATIONS

Non-Final Office Action dated Oct. 7, 2013 for U.S. Appl. No. 13/537,690, 28 pages.

(Continued)

*Primary Examiner* — George Eng
*Assistant Examiner* — Joseph Dean, Jr.
(74) *Attorney, Agent, or Firm* — Amin, Turocy & Watson, LLP

(57) ABSTRACT

Detection of a faulty radio oscillator is provided herein. Also provided herein is detection of faulty mobile timing measurements. Timing measurements, as observed by a mobile device, and an identification of primary scrambling codes associated with the timing measurements are captured. The primary scrambling codes match each timing measurement with a particular radio. The mobile device can also report its location information. Radios for which timing measurements have been received are paired. Based on the paired radios and an associated observed time delay derived from the timing measurements, comparisons can be made between paired radios having at least one common radio. Radios exhibiting an expected timing value can be removed from the analysis in order to isolate a radio that has a faulty radio oscillator.

20 Claims, 12 Drawing Sheets

(56) References Cited

U.S. PATENT DOCUMENTS

| | | | |
|---|---|---|---|
| 2003/0007470 A1 | 1/2003 | Grilli et al. | |
| 2003/0201935 A1 | 10/2003 | King et al. | |
| 2004/0087277 A1* | 5/2004 | Edge | H04W 56/001 455/67.16 |
| 2008/0227401 A1 | 9/2008 | Scherzer et al. | |
| 2009/0070618 A1 | 3/2009 | Dahlen et al. | |
| 2012/0202482 A1 | 8/2012 | Katepalii et al. | |
| 2015/0156655 A1* | 6/2015 | Fix | H04W 24/04 455/424 |

OTHER PUBLICATIONS

Final Office Action dated May 6, 2014 for U.S. Appl. No. 13/537,690, 32 pages.

Notice of Allowance dated Nov. 7, 2014 for U.S. Appl. No. 13/537,690, 23 pages.

Non-Final Office Action dated Mar. 20, 2015 for U.S. Appl. No. 14/616,596, 22 pages.

Notice of Allowance dated Jul. 13, 2015 for U.S. Appl. No. 14/616,596, 40 pages.

\* cited by examiner

DETECTION OF FAULTY RADIO OSCILLATOR OR FAULTY MOBILE TIMING MEASUREMENTS

CROSS REFERENCE TO RELATED APPLICATIONS

This application is a continuation of, and claims priority to each of, U.S. patent application Ser. No. 14/616,596, filed 6 Feb. 2015, now issued as U.S. Pat. No. 9,191,849, entitled "DETECTION OF FAULTY RADIO OSCILLATOR OR FAULTY MOBILE TIMING MEASUREMENTS", which is a continuation of U.S. patent application Ser. No. 13/537,690, filed 29 Jun. 2012, now issued as U.S. Pat. No. 8,989,730, entitled "DETECTION OF FAULTY RADIO OSCILLATOR OR FAULTY MOBILE TIMING MEASUREMENTS." The entireties of the foregoing applications are hereby incorporated by reference herein.

TECHNICAL FIELD

The subject disclosure relates to wireless communications and, more particularly, to faulty radio oscillator detection or faulty mobile timing measurement detection.

BACKGROUND

Wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls have been blamed for user dissatisfaction. On the network side, instances of dropped calls can occur due to a faulty radio oscillator and/or due to faulty mobile timing measurements.

BRIEF DESCRIPTION OF THE DRAWINGS

Various non-limiting embodiments are further described with reference to the accompanying drawings in which.

DETAILED DESCRIPTION

Figure 1:
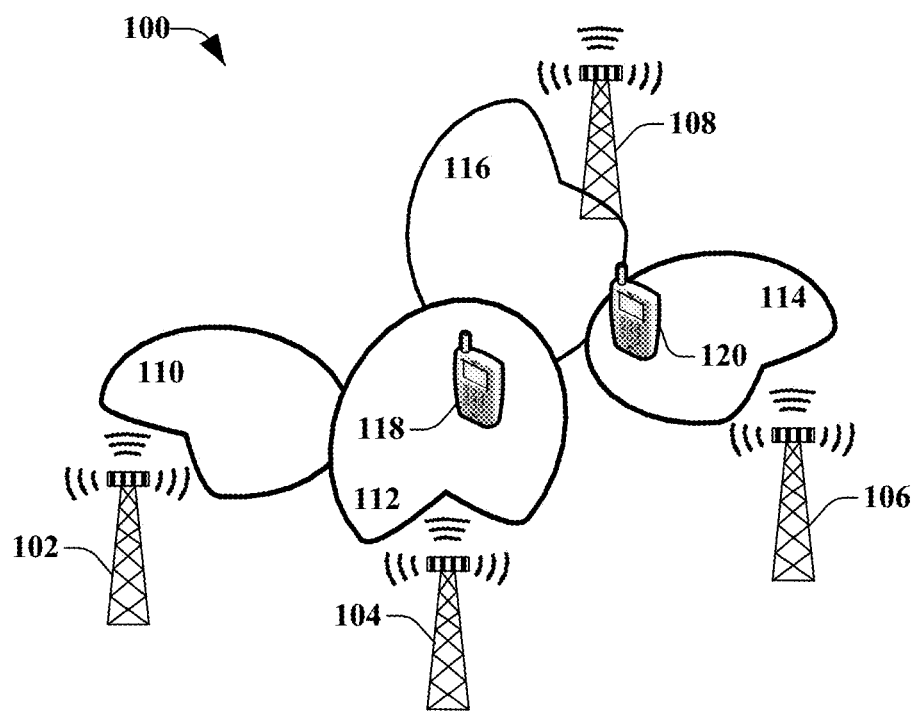
FIG. 1 illustrates an example, non-limiting wireless communications environment in which the disclosed aspects can be utilized, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

An aspect relates to a system comprising at least one memory that stores computer-executable instructions and at least one processor, communicatively coupled to the at least one memory. The at least one processor can facilitate execution of the computer-executable instructions to at least obtain, from a first mobile device, a first set of timing measurements for a first set of radios and a first location of the first mobile device. The processor can also facilitate execution of the computer-executable instructions to obtain, from a second mobile device, a second set of timing measurements for a second set of radios and a second location of the second mobile device. The processor can also facilitate execution of the computer-executable instructions to determine radio pairs from the first set of timing measurements and the second set of timing measurements. Further, the processor can also facilitate execution of the computer-executable instructions to evaluate a subset of the radio pairs from the determined radio pairs relative to other radio pairs having a common radio in order to isolate a radio having a faulty radio oscillator based on respective timing measurements and respective locations of radios of the subset of the radio pairs.

In an example, the at least one processor can further facilitate the execution of the computer-executable instructions to determine that at least one radio from the subset of radio pairs comprises an expected timing measurement within a tolerance. The processor can also facilitate the execution of the computer-executable instructions to eliminate the at least one radio as having the faulty radio oscillator.

In another example, the at least one processor can facilitate the execution of the computer-executable instructions to compute observed time difference values for the subset of the radio pairs and determine propagation delay values based on the respective locations. Further to this example, the at least one processor can further facilitate the execution of the computer-executable instructions to remove the observed time difference values and the propagation delay values from the respective timing measurements to obtain real time delays. The at least one processor can also facilitate the execution of the computer-executable instructions to identify the radio with a real time delay that is different than an expected real time delay value within a tolerance as the radio with the faulty radio oscillator.

The at least one processor, according to another example, can further facilitate the execution of the computer-executable instructions to output a report that identifies the radio having the faulty radio oscillator. In another example, the at least one processor can facilitate the execution of the computer-executable instructions to associate each timing measurement in the first set of timing measurements and the second set of timing measurements with respective primary scrambling codes.

In another example, the at least one processor can facilitate the execution of the computer-executable instructions to determine a first type of the first mobile device and a second type of the second mobile device. Further to this example, the processor can facilitate the execution of the computer-executable instructions to evaluate the subset of the radio pairs based on the first type being different from the second type.

The at least one processor, according to another example, can facilitate the execution of the computer-executable instructions to identify a first fixed reference based on the first location and a second fixed reference based on the second location. Further to this example, the at least one processor can also facilitate the execution of computer-executable instructions to store the first set of timing measurements with the first fixed reference and the second set of timing measurements with the second fixed reference as historical data.

The at least one processor, in accordance with another example, can facilitate the execution of the computer-executable instructions to determine that one or more timing measurements from the first set of timing measurements are outliers based on a comparison with timing measurements from the second set of timing measurements. The at least one processor can also facilitate the execution of the computer-executable instructions to remove the outliers from evaluation to isolate the radio having the faulty radio oscillator.

According to another example, the at least one processor can facilitate the execution of the computer-executable instructions to receive the first set of timing measurements and the second set of timing measurements in respective radio resource measurement reports and receive the first location and the second location information in respective radio access network application protocol location reports.

The at least one processor, in an example, can further facilitate the execution of the computer-executable instructions to receive the first set of timing measurements and the second set of timing measurements as respective reference signal time difference values.

In another example embodiment, an aspect relates to a system comprising at least one memory that stores computer-executable instructions and at least one processor, communicatively coupled to the at least one memory. The at least one processor can facilitate execution of the computer-executable instructions to at least obtain, from a first mobile device, a first set of timing measurements for a first set of radios and a first location of the first mobile device. The processor can also facilitate execution of the computer-executable instructions to obtain, from a second mobile device, a second set of timing measurements for a second set of radios and a second location of the second mobile device. The processor can also facilitate execution of the computer-executable instructions to determine radio pairs from the first set of timing measurements and the second set of timing measurements. Further, the processor can also facilitate execution of the computer-executable instructions to evaluate a subset of the radio pairs from the determined radio pairs relative to other radio pairs having a common radio in order to isolate a radio having a faulty radio oscillator based on respective timing measurements and respective locations of radios of the subset of the radio pairs.

Another embodiment relates to a method that can include receiving, by a system comprising at least one processor, a first set of reports for a first mobile device and a second set of reports for a second mobile device. The method can also include analyzing, by the system, observed time differences between radio pairs identified from the first set of reports and radio pairs identified from the second set of reports including comparing the observed time differences. Further, the method can include determining, by the system, a radio has a faulty oscillator based in part on the analyzing.

Another embodiment relates to a non-transitory computer-readable storage medium storing computer-executable instructions that, in response to execution, cause a system including a processor to perform operations. The operations can include storing a first set of observed time difference measurements received from a first user device and associated with a reported location of the first user device, a second set of observed time difference measurements received from a second user device and associated with a reported location of the second user device, and a third set of observed time difference measurements received from a third user device and associated with a reported location of the third user device. The operations can also include comparing pairs of sectors identified in the first, second, and third set of observed time difference measurements. The pairs of sectors have at least one common sector. The operations can also include detecting a faulty radio oscillator for at least one of the sectors of the pairs of sectors based in part on the comparing.

It is noted that although various aspects and embodiments are discussed herein with respect to Universal Mobile Telecommunications System (UMTS), the subject disclosure is not limited to a UMTS implementation. For example, aspects or features of the disclosed embodiments can be exploited in substantially any wireless communication technology. Such wireless communication technologies can include Universal Mobile Telecommunications System (UMTS), Code Division Multiple Access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Referring initially to FIG. 1, illustrated is an example, non-limiting wireless communications environment 100 in which the disclosed aspects can be utilized, according to an embodiment. A wireless communications environment 100 can comprise any number of sectors (or cells). The illustrated wireless communications environment 100 includes a first sector 102, a second sector 104, a third sector 106, and a fourth sector 108, although more (or fewer) than four sectors can be utilized in a wireless communications environment. Each sector has a respective geographic area or coverage area. For example, first sector 102 has a first coverage area 110, second sector 104 has a second coverage area 112, third sector 106 has a third coverage area 114, and fourth sector 108 has a fourth coverage area 116.

Also illustrated are two mobile devices, labeled as a first mobile device 118 and a second mobile device 120, although more than two mobile devices can be operated within the wireless communications environment 100. As utilized herein, a mobile device can include a UMTS-based electronic device, such as, but not limited to, a cell phone, a PDA (personal digital assistant), a media player, a digital camera, a media recorder, a laptop, a personal computer, a printer, a scanner, a tablet, a GPS (global positioning system) module, a gaming module, and so forth. Further, the device can also include UMTS-based appliances that can be employed, for example, in a home, office, building, retail store, restaurant, hotel, factory, warehouse, and so on. As previously noted, although the various aspects are discussed herein with reference to UMTS, the aspects are not limited to an UMTS implementation. Instead, the various aspects can be utilized with other network technologies and UMTS technology is utilized herein for purposes of simplicity.

As the first mobile device 118 and the second mobile device 120 are moved within the wireless communications environment 100 and/or are moved into or out of the coverage area(s) of the wireless communications environment 100, one or more handoffs may occur. A handoff (also referred to as a handover) is a process of transferring an ongoing call or an ongoing data session between base stations (e.g., sectors) so as to mitigate communication coverage disruptions. For example, as second mobile device 120 is moved from third coverage area 114 to fourth coverage area 116, a seamless handoff can occur from third sector 106 to fourth sector 108.

In the case of a UMTS network, for example, the handoff can be a soft handoff. During a soft handoff, the mobile device (e.g., second mobile device 120) is connected to two or more sectors (e.g., third sector 106 and fourth sector 108) at substantially the same time as the communication is occurring. To facilitate the soft handover, the mobile device can perform and report power measurements of the neighboring sectors to determine whether a handover should be requested.

Some problems that can develop during soft handover are related to a faulty radio oscillator. Radio oscillators should maintain oscillator stability within a defined tolerance. When an oscillator falls outside the defined tolerance, a mobile device can experience increased difficulty during soft handover operations. Soft handover failures can be mitigated with the disclosed aspects by detection of radio oscillator instability through observations against multiple radio base stations (e.g., sectors). For example, mobile devices can measure observed time differences between Node B's during event-based handover areas and at other times (e.g., periodically as defined within the 3G Radio Access Network). These measurements, when observed over time, and through multiple NodeB relationships can be utilized to reveal radio oscillator instability, as disclosed herein.

Figure 2:
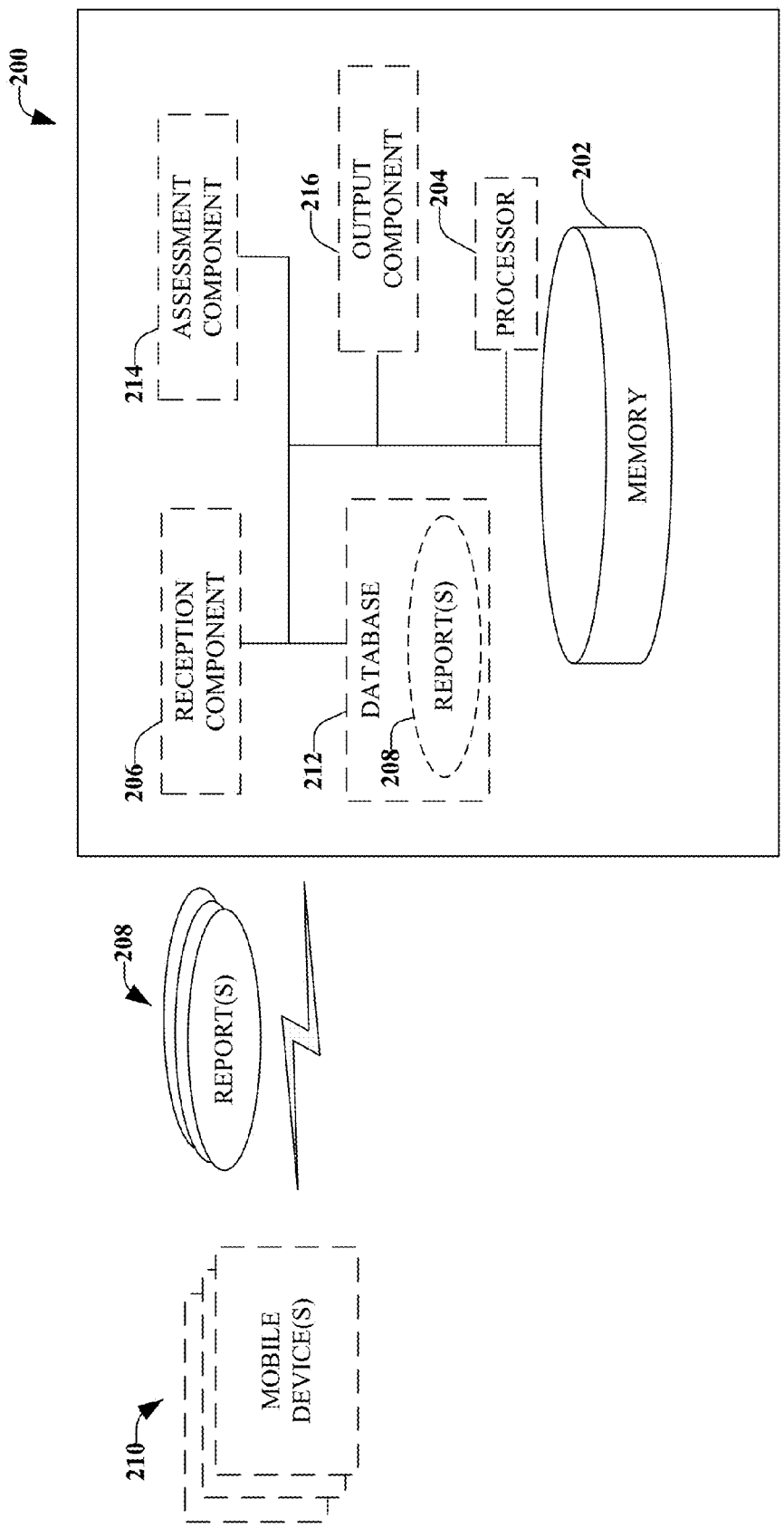
FIG. 2 illustrates an example, non-limiting system configured to detect radio oscillator instability, according to an aspect.

FIG. 2 illustrates an example, non-limiting system 200 configured to detect radio oscillator instability, according to an aspect. Benefits of the disclosed aspects include operational support of defective radio oscillators and/or improved radio access performance through successful soft handover operations and decreased drop call rates. For example, a single radio can share numerous radio neighbor relations and, if the radio is defective, the defective radio can wreak havoc throughout its designated coverage area and coverage overlap area. The disclosed aspects can mitigate the damage that can be caused by defective radios (e.g., radio oscillators) by detecting and reporting the occurrence of a faulty radio oscillator without the need to replace the entire radio in order to diagnose the fault.

For example, a method of faulty radio oscillator detection includes observing indirect performance matrixes, such as noting issues with handover between a particular site and/or problems trying to access a site. Detection of a faulty radio oscillator would be performed based on trial and error. For example, if a problem is occurring, the entire radio might be removed and replaced. Later, after performance of various failure analysis tests (e.g., at the manufacturer's facility), it might be determined that the oscillator is not stable. However, such failure analysis testing occurs after the entire radio is replaced and after costly and time consuming analysis is performed. Further, after the entire radio is replaced, it might be determined that the oscillator is performing correctly and that the problem was elsewhere on the network and/or mobile device(s).

System 200 can be implemented in a network (e.g., base station, access point, sector, NodeB, and so forth). As previously noted, although the various aspects are discussed herein with reference to UMTS, the disclosed aspects are not limited to an UMTS implementation. Instead, the various aspects can be utilized with other network technologies and UMTS technology is utilized herein for purposes of simplicity while explaining the various aspects.

System 200 can include at least one memory 202 that can store computer executable components and computer executable instructions. System 200 can also include at least one processor 204, communicatively coupled to the at least one memory 202. Coupling can include various communications including, but not limited to, direct communications, indirect communications, wired communications, and/or wireless communications. The at least one processor 204 can facilitate execution of the computer executable components and instructions stored in the memory 202. It is noted that although one or more computer executable components may be described herein and illustrated as components separate from memory 202 (e.g., operatively connected to memory), in accordance with various embodiments, the one or more computer executable components could be stored in the memory 202. Further, while various components have been illustrated as separate components, it will be appreciated that multiple components can be implemented as a single component, or a single component can be implemented as multiple components, without departing from example embodiments.

System 200 can also include a reception component 206 that can be configured to receive reports 208 from a multitude of mobile devices 210 (e.g., first mobile device 118, second mobile device 120, and so forth). For example, each mobile device can measure multiple radios during defined events related to soft handover. These measurements can be reported, by the mobile device, to the network (e.g., to reception component 206). In an implementation, the measurements can be reported by the mobile device in a Radio Resource Control (RRC) Measurement Report. In another implementation, the measurements can be received as reference signal time difference (RSTD) measurements.

The measurements can comprise, for each radio (e.g., radio for each sector), a primary scrambling code and a timing measurement (Tm) value. The primary scrambling code can be utilized to distinguish each sector's transmissions from transmissions from other sectors (or cells). The Tm value is a timing measurement representing the difference between the SFN (System Frame Number) and the CFN (Connection Frame Number) as received at the mobile device for each radio.

Another report received by the reception component 206 can be a location report that identifies the geographic coordinates or location (e.g., latitude, longitude, altitude) of the mobile device at the time (or substantially the same time as) the report is generated by the mobile device. In an implementation, the location can be a RANAP (Radio Access Network Application Protocol) Location Report that can be conveyed to the network (e.g., to reception component 206) when requested by an external service through the control plane, or at a different time.

The one or more reports 208 received from the mobile devices 210 (e.g., a mobile device can convey more than one report and/or multiple mobile devices can transmit one or more reports) can be stored in a database 212 (as illustrated) or another computer readable storage medium. It is noted that a database (e.g., database 212) can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory. In an aspect, database 212 is included as a component within the disclosed systems. However, according to other aspects, the database 212 can be located remote from the system but can be accessed by system (e.g., over an air interface).

Also included in system 200 is an assessment component 214 that can be configured to perform comparisons associated with the Tm values, primary scrambling codes, and the mobile device location reports. The assessment component 214 can utilize both historical data (e.g., data reported earlier in minutes, hours, days, weeks, and so forth) with current data (e.g., date reported within the last few minutes). In an implementation, the assessment component 214 can be configured to determine pairings of the sectors as reported by the mobile devices. The pairings can be determined by the assessment component 214 based on the primary scrambling code associated with each timing measurement. For example, as many mobile devices (e.g., 10 devices, 15 devices, 30 devices, 76 devices, and so forth) report timing measurements and associated primary scrambling code information (as well as respective position information), the assessment component 214 can determine which sectors are within close proximity of each other and can be paired.

For example, when a first mobile device reports timing measurements of a first set of sectors, it is in indication that the mobile device, at its current location, is within (or near) the coverage areas of the sectors within the first set of sectors. Further, when a second mobile device reports timing measurements of a second set of sectors, it indicates that the second mobile device, at its current location, is within (or near) the coverage areas of the sectors within the second set of sectors. Subsequent mobile devices can also report timing measurements of subsequent sets of sectors. In some aspects, the same sector(s) can be contained within each set (e.g., first set, second set, subsequent sets), such as in the case where the mobile devices are located in substantially the same location or within a certain area. In some cases, there might not be overlap of the sectors within the sets, such as if the mobile devices are located in different areas of a city, on opposite sides of a tall building, and so forth.

For example, a first mobile device reports timing measurements for Sector A, Sector B, and Sector D; a second mobile device reports timing measurements for Sector B, Sector C, and Sector D; and a third mobile device reports timing measurements for Sector B Sector E and Sector F. Based on these reports, the assessment component can determine sector pairings, such as Sector A-Sector B pair (AB pair), AD pair, BA pair, BD pair, BC pair, CB pair, CD pair, DC pair, BE pair, BF pair, EF pair, FE pair, and so on.

In another example, the timing measurements can be utilized at substantially the same time as neighbor lists (intra-frequency and/or inter-frequency). A neighbor list is a table that associates each sector with its neighboring sectors and which a mobile device can use to initiate a handover request. The neighbor list can be stored in a database or memory. The assessment component 214 can compare the timing measurements received with the neighbor list and determine the pairing if the sectors are indicated as neighbors. Thus, according to this example, if the sectors are not identified in the list as neighbors, the pairing between the sectors might not be created. However, according to various implementations, a neighbor list is not utilized with the disclosed aspects.

Based on the pairings and through a process of elimination, a faulty radio oscillator can be detected, which might also be indicated if various problems have been observed within a wireless communications environment (e.g., soft handover issues). In an example, assessment component 214 can evaluate the pairings associated with a first sector (e.g., Sector B) and a fixed location (e.g., location as reported by the mobile device(s)). If the timing measurements of some pairings of Sector B (e.g., pairings AB, BA, BC, CB, and so forth) are good (e.g., the timing measurements of each pairing represents an expected value within a tolerance) except when paired with sector C, assessment component 214 can determine that Sector B is operating correctly and can eliminate Sector B as having a defective radio oscillator. Assessment component 214 might also make a preliminary determination that Sector C might be faulty and can evaluate the other pairings. Further to this example, Sector A's measurements, relative to the other sector's measurements, might be good in all cases except for the AC pairing (or the CA pairing). Thus, assessment component 214 can eliminate Sector A as having a defective radio oscillator. Assessment component 214 can continue the evaluations of the pairs (wherein the pairs comprise at least one common sector) and in a similar manner eliminate other sectors by determining those other sectors do not have a defective oscillator. Through this process, the sector that has the defective radio oscillator (e.g., Sector C in this example) can be isolated and identified by the assessment component 214. Further details related to the elimination and isolation of sectors will be provided below.

Also included in system 200 is an output component 216 that can be configured to convey information to a network operator or another user and/or entity (e.g., the Internet, another system, a computer, machinery, and so forth), hereinafter referred to as users and/or entity, depending on the context. In an example, a request can be sent to system 200 in order to initiate the analysis of the various sectors and identification of a potential faulty radio oscillator. However, according to some aspects, the analysis and identification is ongoing such that as mobile devices provide reports, a faulty radio oscillator is detected and identified automatically.

At substantially the same time as the analysis is completed by system 200 (or sometime thereafter), output component 216 can convey the information to a user and/or entity. In an implementation, the analysis information can be transmitted in an exception report that includes the identified sector and/or can include analysis and information related to the other sectors (e.g., sector identification, timing measurements reported by the mobile devices, an identification of the type of each mobile device, and so forth). Based on the analysis received from output component 216, the faulty radio oscillator can be replaced or another action can be performed (e.g., entire radio replaced, maintenance scheduled, no action until further analysis is received, and so forth) as deemed appropriate based on various considerations including standard operating procedures related to the network.

Figure 3:
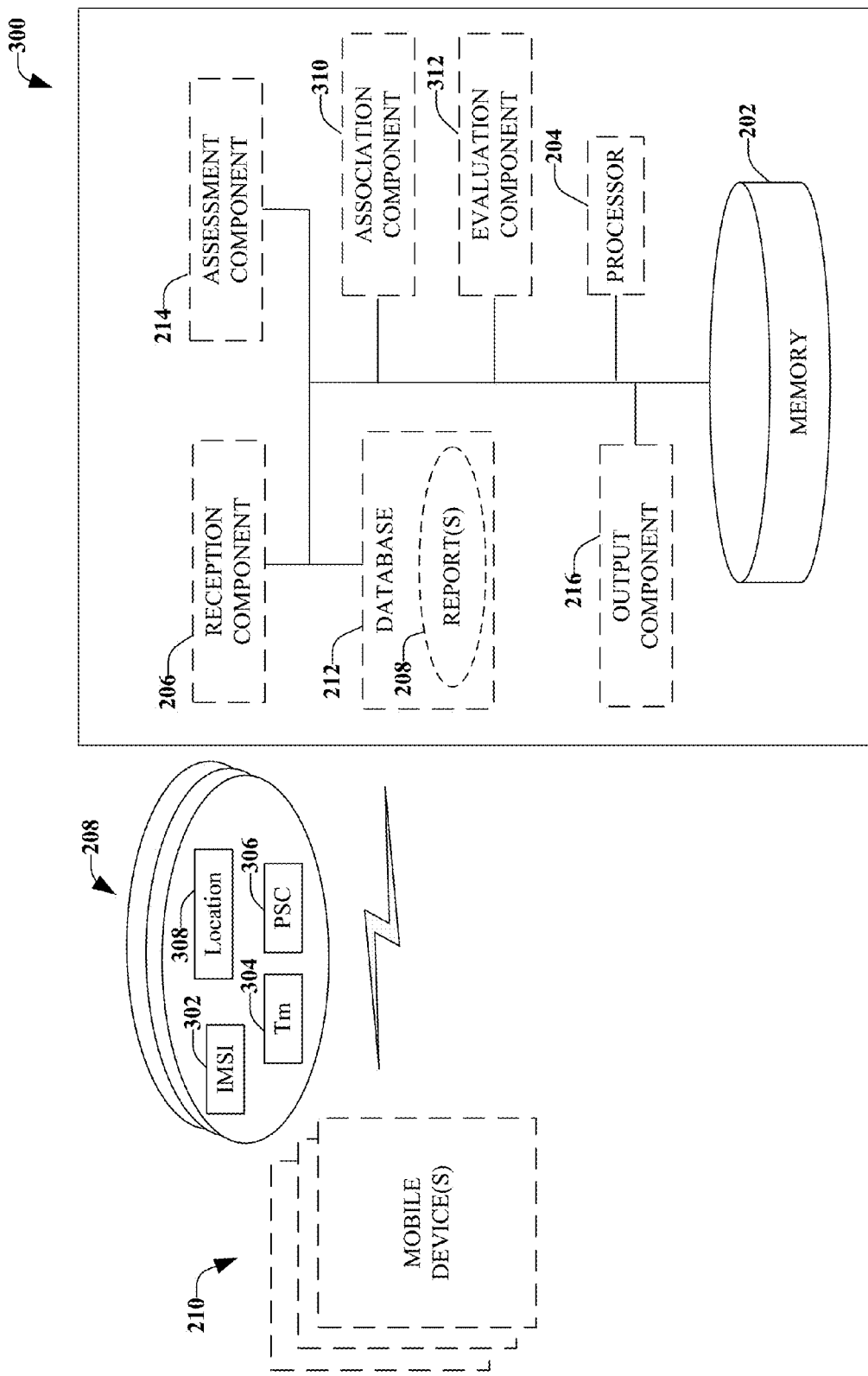
FIG. 3 illustrates another example, non-limiting system configured to evaluate various sectors and determine whether one or more sectors has a faulty radio oscillator, according to an aspect.

FIG. 3 illustrates another example, non-limiting system 300 configured to evaluate various sectors and determine whether one or more sectors has a faulty radio oscillator, according to an aspect. Each mobile device included in the set of mobile devices 210 can be identified based on its international mobile subscriber identity (IMSI 302), which is a unique identification associated with various mobile devices. The IMSI 302 can be a number having 15 digits or any other number of digits. The IMSI 302 can be included in one or more reports 208 transmitted by each mobile device.

Each mobile device can also report timing measurements values (Tm values 304), which are the timing measurements as measured by each mobile device. In an implementation, the Tm values 304 can be reported in an RRC measurement report or a different type (or name) of report. Each Tm value can be associated with a primary scrambling code (PSC 306), which differentiate radios (e.g., WCDMA) radios from one another, as detected by the mobile device. The PSC 306 can be transmitted in the RRC measurement report according to an implementation.

Each mobile device can also reports its current location 308 (e.g., position information), which can include various geographic coordinates including latitude, longitude, and/or altitude. In an implementation, the current location 308 of the mobile device can be received in a RANAP location report or a different type (or name) of report.

The various information from each mobile device (e.g., IMSI 302, Tm 304, PSC 306, current location 308) can be received by reception component 206. Further, the various information can be stored in database 212. The various information and/or reports can be stored in the database (or other storage medium) in any type of format (e.g., table, list, and so forth) that allows the information to be accessed, as needed.

Also included in system 300 is an association component 310 that can be configured to create pairs of sectors. The pairs of sectors can be created by association component 310 based on all possible combinations of the Tm values 304, as reported by each mobile device. For example, the pairs can be formed based on radios from a single site or from radios on one or more different sites.

Based on the pairs created by association component 310, an evaluation component 312 can be configured to determine which sector in the reported sectors is the sector that has a radio oscillator failure. The evaluation component 312 can isolate a potential faulty radio oscillator by eliminating all other radios in the pairs of sectors (e.g., based on pairs that share a common sector). In some cases, a faulty radio oscillator might not be included in any of the pairs and evaluation component 312 can provide information that there was no faulty radio oscillator detected. However, in some aspects, if a faulty radio oscillator is not detected, no further action is performed by evaluation component 312 for that particular analysis (e.g., no information is provided to output component 216).

For example, each Tm value, when compared with all other radio Tm values, yields an observed time difference (OTD), where $OTD_{ji} = Tm_j - Tm_i$, where j and i represents Site j and Site i, respectively. The location report or current location 308 can provide a fixed reference location for each Tm value. In the case of a UMTS network, which might not be GPS synchronized, the fixed reference location is established based on the location report when the location report is received at about the same time the Tm values are received. Once the fixed reference location is obtained, the OTD measures can be recorded (e.g., stored in database 212). Overtime, as many measurements are obtained, a single radio issue can be detected, as compared with all other radios for which information has been received. In an implementation, the OTD and a propagation delay can be removed from the Tm value, resulting in a real time difference (RTD) between the pairs of sectors. The propagation delay is the amount of time that it takes for the signal to go from the sector side radio to the mobile device. The RTD can represent the back end stability of the system and should be the same for all mobile devices, unless a faulty oscillator is present.

Figure 4:
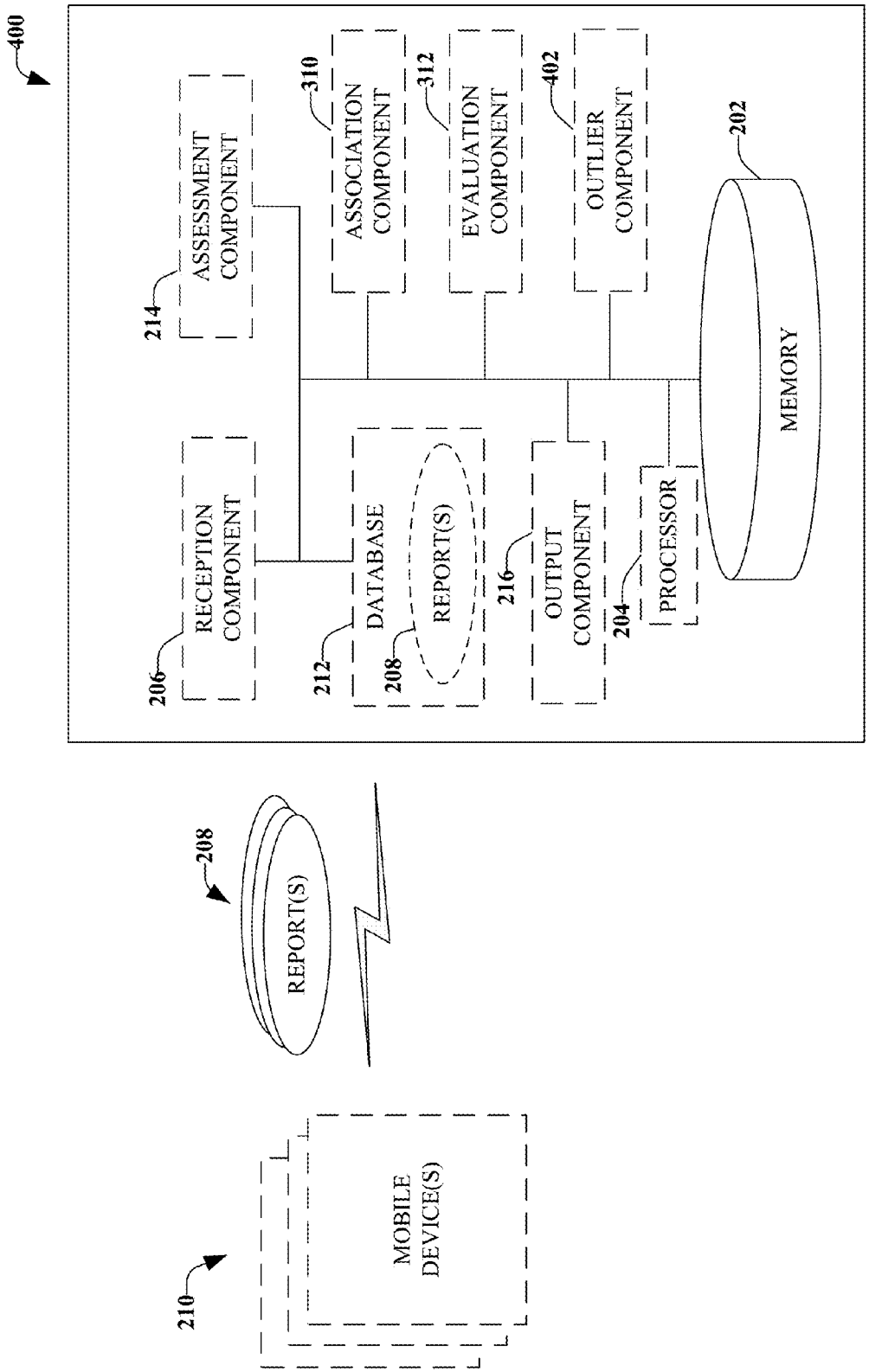
FIG. 4 illustrates an example, non-limiting system for detecting a faulty radio oscillator while compensating for data reported erroneously, according to an aspect.

FIG. 4 illustrates an example, non-limiting system 400 for detecting a faulty radio oscillator while compensating for data reported erroneously, according to an aspect. System 400 is configured to detect a mobile device that is not reporting correct information, which can be due to the mobile device being defective and/or for other reasons (e.g., incorrect time measurements, and so forth). In order to mitigate the chances that erroneous data is utilized to detect a faulty radio oscillator and thereby inappropriately skew the results, system 400 can include an outlier component 402 that can be configured to determine where one or more mobile devices are reporting vastly different measurements when compared with reported information from other mobile devices.

In an implementation, outlier component 402 can review the timing measurements received from each device and can cause other system components to ignore faulty measurements. For example, outlier component 402 can utilize outlier detection, which can include identifying timing measurements that are distinct from a set of other, substantially the same, timing measurements (e.g., timing measurements from the same sector, timing measurements at the same or similar location, and so forth). If one or more distinct timing measurements are discovered, outlier component 402 can remove (e.g., delete) the distinct timing measurement from the database 212, according to an aspect.

In another implementation, outlier component 402 can be configured to flag the one or more timing measurements, wherein the flag instructs the other system components to ignore the flagged timing measurement. In some implementations, outlier component 402 can delete or flag all measurements (and associated sector pairs) from the mobile device that exhibits the potentially erroneous measurement reports.

Figure 5:
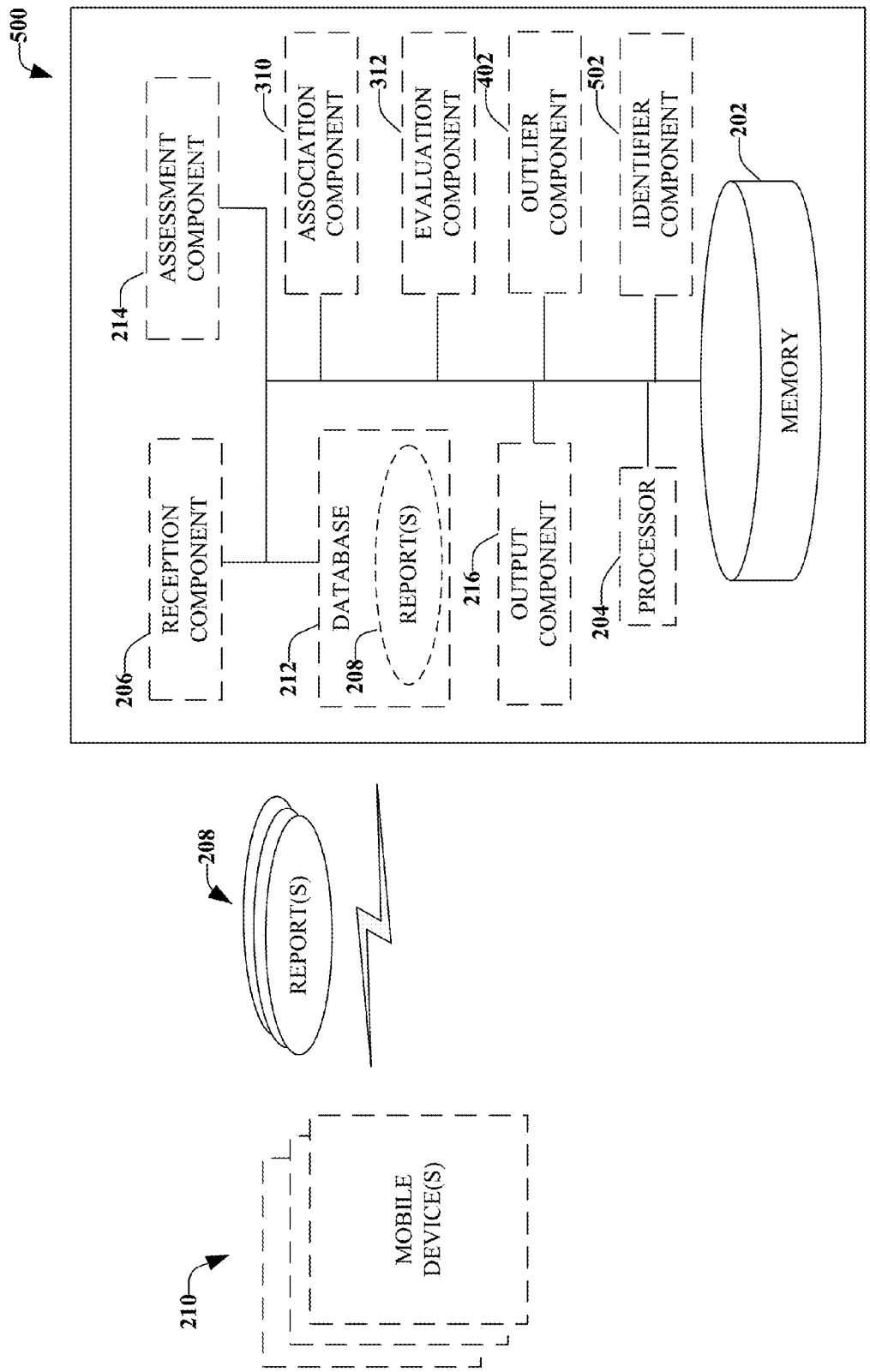
FIG. 5 illustrates an example, non-liming system configured to obtain information from multiple mobile device types, wherein the information is utilized to detect a faulty mobile timing measurement, according to an aspect.

FIG. 5 illustrates an example, non-liming system 500 configured to obtain information from multiple mobile device types, wherein the information is utilized to detect a faulty mobile timing measurement, according to an aspect. For example, system 500 can be utilized to distinguish between mobile types in order to determine whether the measurements indicate a faulty radio oscillator or instead whether the measurements indicate that a particular mobile type is reporting different measurements (in some cases widely different measurements) than those measurements being reported by other mobile types.

System 500 includes an identifier component 502 that can be configured to separate the reports based on mobile type. Information related to the type of mobile device that is reporting the various information (e.g., timing measurements, position information, and so forth) can be derived from the IMSI conveyed by the mobile device. For example, identifier component 502 can access a database or other storage media that contains information that can be used to cross reference the IMSI to a mobile type. Identifier component 502 can separate the various reported information by mobile type. Over time, the reported information can be reviewed to determine whether a particular mobile type is providing incorrect measurements.

If it is determined that a particular mobile type is reporting incorrect information, outlier component 402 can remove the measurements and other reported information reported by mobile devices of the identified type. In another implementation, outlier component 402 can flag the information, which can be selectively ignored by other system components when attempting to detect the presence of a faulty radio oscillator.

Additionally or alternatively, identifier component 502 can be configured to ascertain the type of mobile device providing the reports (e.g., timing information, primary scrambling code, and so forth). If the reports are received from a single mobile device type, the reports might not be considered. However, if the reports are received from two or more mobile devices of different types, the reports might be deemed acceptable to be analyzed for the presence of a faulty radio oscillator as discussed herein.

Figure 6:
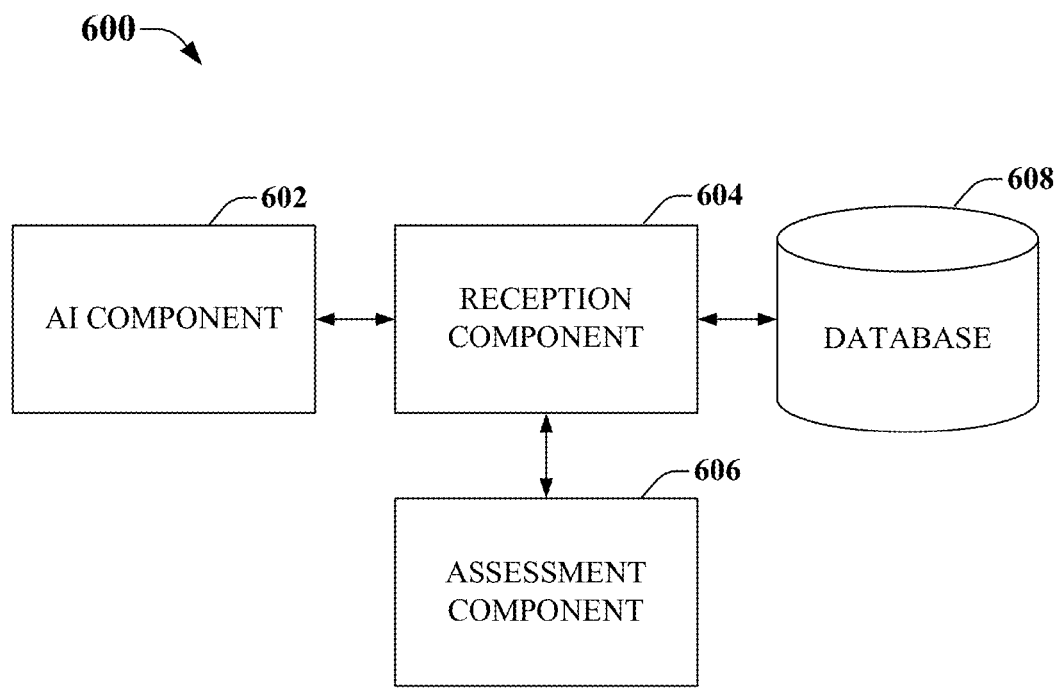
FIG. 6 illustrates an example, non-limiting system that employs an artificial intelligence component, which facilitates automating one or more features in accordance with the disclosed aspects.

FIG. 6 illustrates an example, non-limiting system 600 that employs an artificial intelligence (AI) component 602, which facilitates automating one or more features in accordance with the disclosed aspects. A reception component 604, an assessment component 606, a database 608, as well as other components (not illustrated) can include functionality, as more fully described herein, for example, with regard to the previous figures. The disclosed aspects (e.g., in connection with detecting a faulty radio oscillator and/or detecting faulty mobile timing measurements) can employ various AI-based schemes for carrying out various aspects thereof. For example, a process for collecting timing measurements, primary scrambling codes, position information, and/or mobile device type information can be facilitated through an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that should be automatically performed. In the case of communication systems, for example, attributes can be information stored in the database 608, and the classes can be categories or areas of interest (e.g., timing measurements related to sector pairs).

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

As will be readily noted, the disclosed aspects can employ classifiers that are explicitly trained (e.g., through a generic training data) as well as implicitly trained (e.g., through observing timing measurements and other received data, receiving extrinsic information, and so on). For example, SVMs can be configured through a learning or training phase within a classifier constructor and feature selection module. Thus, the classifier(s) can be used to automatically learn and perform a number of functions, including but not limited to determining according to a predetermined criteria whether a faulty radio oscillator has been detected, whether a type of mobile device is providing incorrect information, and so on. The criteria can include, but is not limited to, historical timing measurements, mobile device type, problems associated with soft handover within a wireless communications network, location of the mobile device, operating procedures associated with the network, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component, and so forth). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 7:
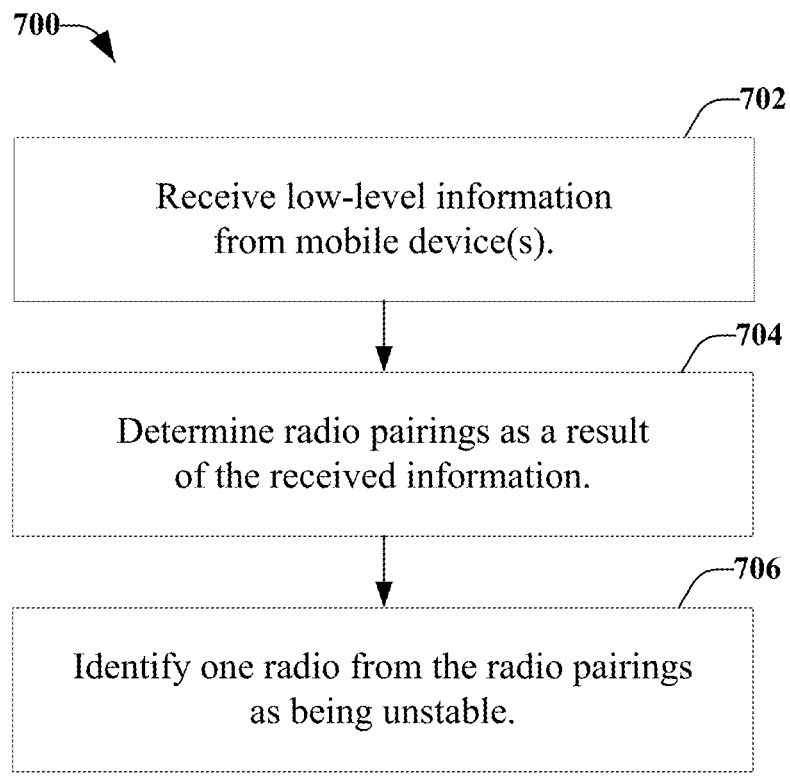
FIG. 7 illustrates a method for detection of radio oscillator instability, according to an aspect.

FIG. 7 illustrates a method 700 for detection of radio oscillator instability, according to an aspect. Method 700 starts, at 700 when low-level information is received from one or more mobile devices. The low-level information can comprise timing measurements and position information as reported by the mobile device. The timing measurements can be measured by the respective mobile device and represent the timing measurements between radios from different sites at the time of the measurement. The position information is the geographic location (e.g., altitude, latitude, longitude) of the mobile device at the time the report is provided. In an implementation, the timing measurements are received in a RRC Measurement report(s) and the location information is received in a RANAP Location Report.

At 704, the radio pairings are determined as a result of the received information. For example, there are four radios on the same site (although the four radios can be on different sites, the same site is utilized for example purposes). The four radios are Radio K, Radio I, Radio J, and Radio M. An RRC measurement report (or a different report comprising timing measurement information) is received for the four radios and are paired together to derive relative timing measurements. Thus, there is a Radio K-Radio I (KI) measurement, a Radio K-Radio J (KJ) measurement, a Radio K-Radio M (KM) measurement, as well as other pairings (e.g., Radio I-Radio J (IJ) measurement, Radio I-Radio M (IM) measurement, Radio J-Radio M (JM) measurement, and so forth). Thus, the different combinations are identified.

For each pair of measurements, position information is available (e.g., from the RANAP report that provides a specific location of the mobile device at the time of the measurement). Thus, if the timing measurement and the position information are provided at substantially the same time, it can be assumed that the relative measurements that are being reviewed occurred at that location (or substantially at that location).

The time difference of arrival (TDOA) for calculating multilateration for locating a mobile device can be utilized, in part, because the disclosed aspects are utilized to find various parameters related to the network. For example, a portion of the TDOA is an observed time difference (OTD), which is the OTD as observed by the mobile device and what is utilized to perform the above noted pairings.

At 706, at least one radio from the radio pairings is identified as being unstable. The identification can be based on observations of the one radio (based on its radio pairings) as compared to the other radios (based on their respective radio pairings), wherein the radio pairings share a common radio.

Through a process of elimination, a radio that exhibits instability can be ascertained. For example, there are four radios, Radio K, Radio I, Radio J, and Radio M, which results in at least the following parings: KI, KJ, KM, IK, IJ, IM, JK, JI, JM, MK, MI, and MJ. In this example it is observed that Radio I can be eliminated because Radio I is good in all cases (e.g., IJ, IM, JI, MI) except when paired with Radio K (e.g., KI, IK). Further, Radio J can be eliminated because Radio J is observed to be good in all cases (e.g., IJ, JI, MJ, JM) except when paired with Radio K (e.g., KJ, JK). Further to this example, Radio M can be eliminated because Radio M is observed to be good in all cases (e.g., IM, JM, MI, MJ) except when paired with Radio K (e.g., KM, MK). Thus, in this example, Radio K can be isolated as being faulty or unstable.

Figure 8:
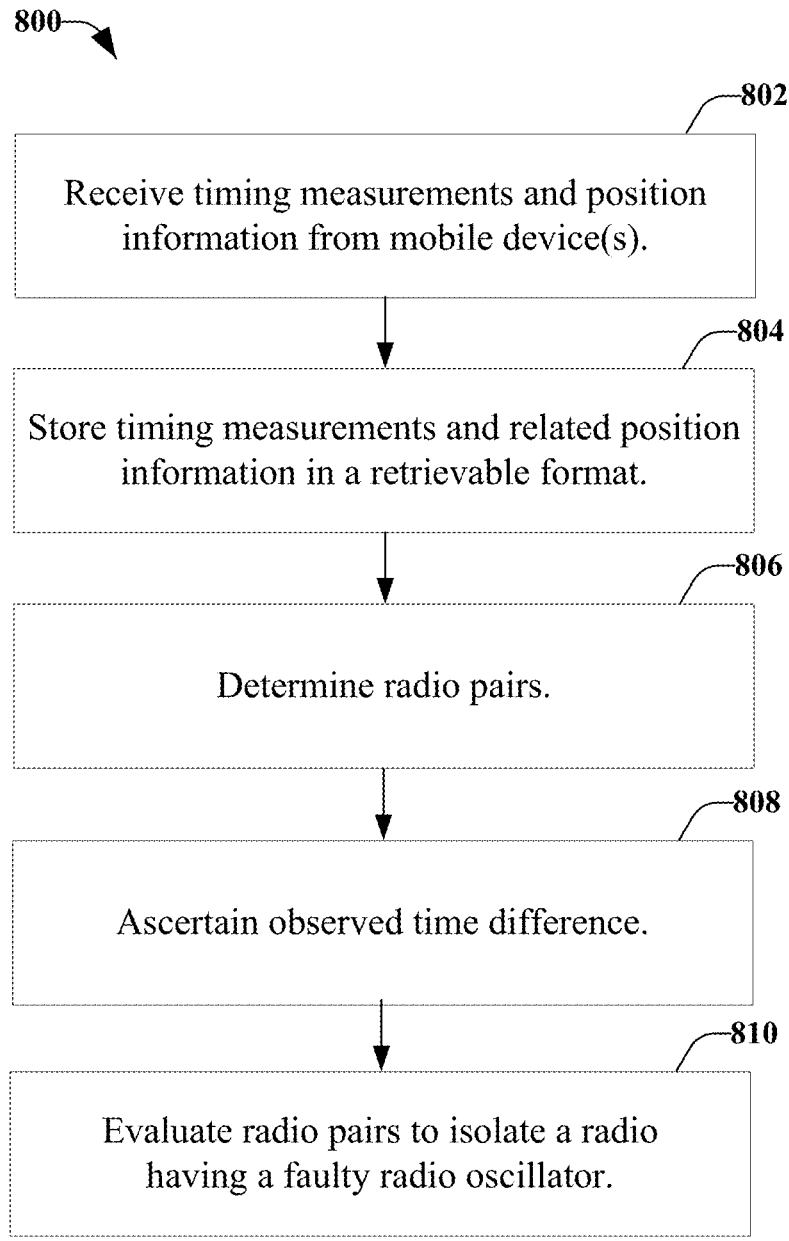
FIG. 8 illustrates another example, non-limiting method for isolating a faulty radio oscillator, according to an aspect.

FIG. 8 illustrates another example, non-limiting method 800 for isolating a faulty radio oscillator, according to an aspect. At 802, timing and position reports are received from a multitude of mobile devices. Each mobile device can report timing measures for similar sectors or for different sectors. In an example, a first mobile device can provide measurement reports for a first set of sectors and a second mobile device can provide measurement reports for a second set of sectors. In an implementation, at least one sector in the first set and the second set overlap (or are common to both sets). For example, the first set can contain timing information related to Sector A, Sector C, and Sector D and the second set can contain information related to Sector D, Sector E, and Sector F (wherein Sector D is the common or overlapping sector). According to another implementation, there might not be any sectors within the first set and the second set that overlap. For example, the first set can contain timing information related to Sector A, Sector B, and Sector C and the second set can contain information related to Sector D, Sector E, and Sector F. In this cases, the sets are stored as historical data and used for later analysis with additional sector pairings.

The timing measurements and associated position information can be stored, at 804, in a retrievable format. For example, the information can be stored in a memory or a database (as historical data). As other mobile devices (or the same mobile device) provide additional timing measurements and associated position information, the data is aggregated with the previously received information. In an example, the information can be stored as a mapping wherein the timing information is mapped to an identification of the radio. Further, the timing information and radio identification can be mapped to a location of the mobile device when the timing information was reported.

At 806, radio pairs from the timing measurements for the first set and the second set of radios are determined Continuing the example where the first set contains timing information related to Sector A, Sector C, and Sector D and the second set contains timing information related to Sector D, Sector E, and Sector F, the radio pairs that can be determined include: A-C pair, A-D pair, C-D pair, D-E pair, D-F pair, E-F pair, and so forth.

The observed time difference is ascertained, at 808, based on subtracting a time measurement of a first sector from a time measurement of a second sector. For example, the observed time difference for sector pair C-D is obtained by subtracting the time measurement of sector D from the time measurement of sector C ($OTD_{CD}=Tm_C-Tm_D$). The observed time difference and a propagation delay are removed from the respective timing measurements to obtain a real time delay. At 810, each radio pair is evaluated with respect to other radio pairs, having a common radio, to isolate a radio having a faulty radio oscillator.

Figure 9:
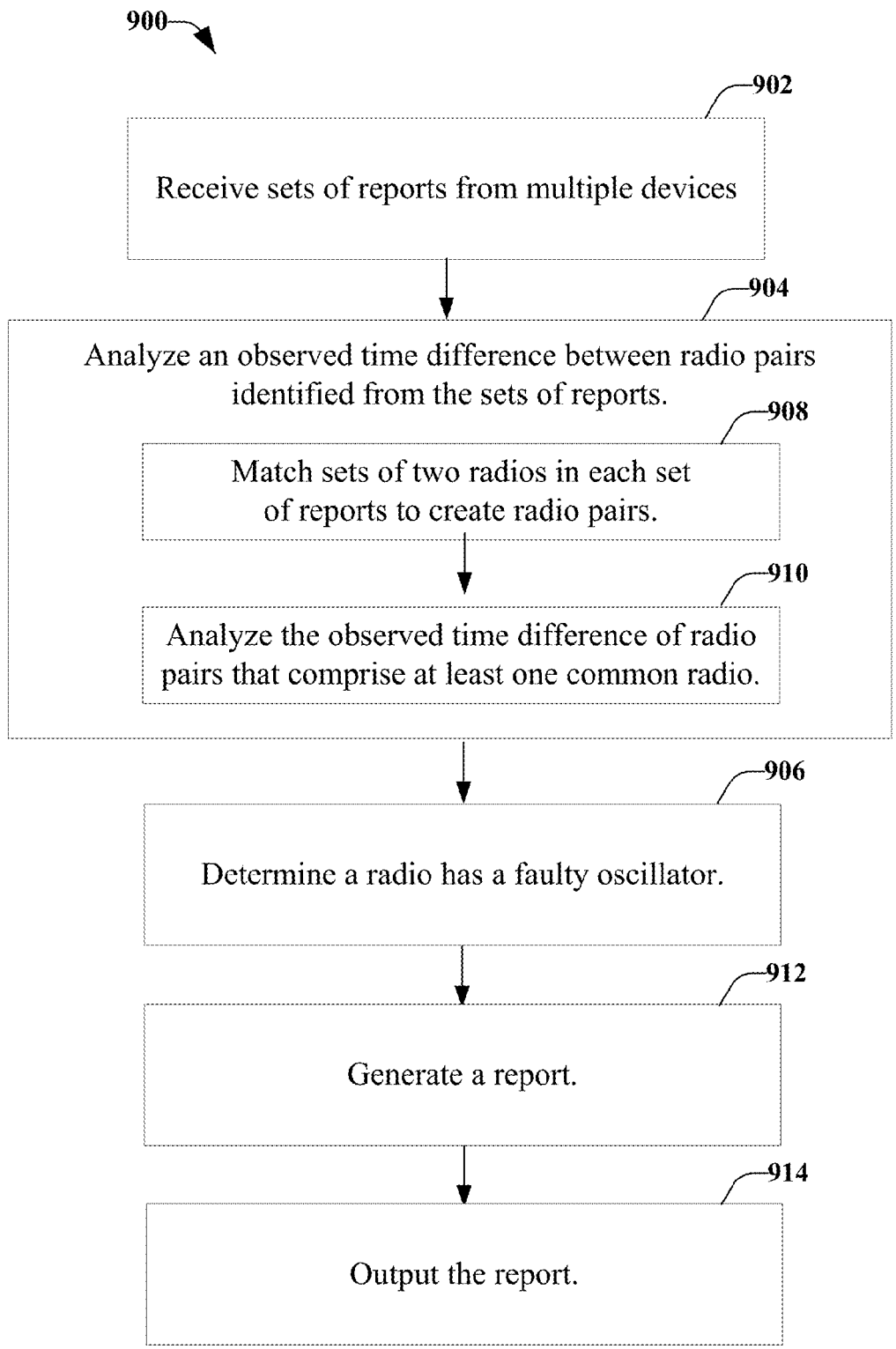
FIG. 9 illustrates another example, non-limiting method for detecting a radio that has a faulty oscillator, according to an aspect.

FIG. 9 illustrates another example, non-limiting method 900 for detecting a radio that has a faulty oscillator, according to an aspect. At 902, sets of reports are received from multiple mobile devices. For example, a first set of reports can be received from a first mobile device and a second set of reports can be received from a second mobile device. At 904, an observed time difference between radio pairs identified from the sets of reports is analyzed. A radio having a faulty oscillator is determined, at 906, based in part on a comparison of the observed time differences of each radio pair with other radio pairs that share a common radio.

In an implementation, the analysis, at 904, can include matching, at 908, sets of two radios in the first set of reports to determine radio pairs and matching sets of two radios in the second set of reports to determine radio pairs. Further, at 910, the observed time difference of radio pairs that comprise at least one common radio are analyzed to determine the radio that has the faulty oscillator, if any. In an implementation, the first set of reports can comprise timing measurements, and associated primary scrambling codes, measured by the first mobile device and the second set of reports can comprise timing measurements, and associated primary scrambling codes, measured by the second mobile device.

In some implementations, method 900 can include generating, at 912, a report that identifies the radio having the faulty radio oscillator. At 914, the report is output to at least one device (e.g., a computer associated with a network operator). In accordance with some aspects, information about the identified faulty radio oscillator can be transmitted to a network operator through an exception report or through another means of conveying the information related to the faulty oscillator.

According to some aspects, the method can include identifying a first mobile type of the first mobile device and a second mobile type of the second mobile device. Further to this aspect, determining the radio has the faulty oscillator is performed if the first mobile type and the second mobile type are different.

In accordance with some aspects, the method can include determining one or more timing measurements from a first set of timing measurements are outliers when compared with timing measurements from a second set of timing measurements. Further to this aspect, the method can include removing the outliers from the determination of a faulty radio oscillator.

Figure 10:
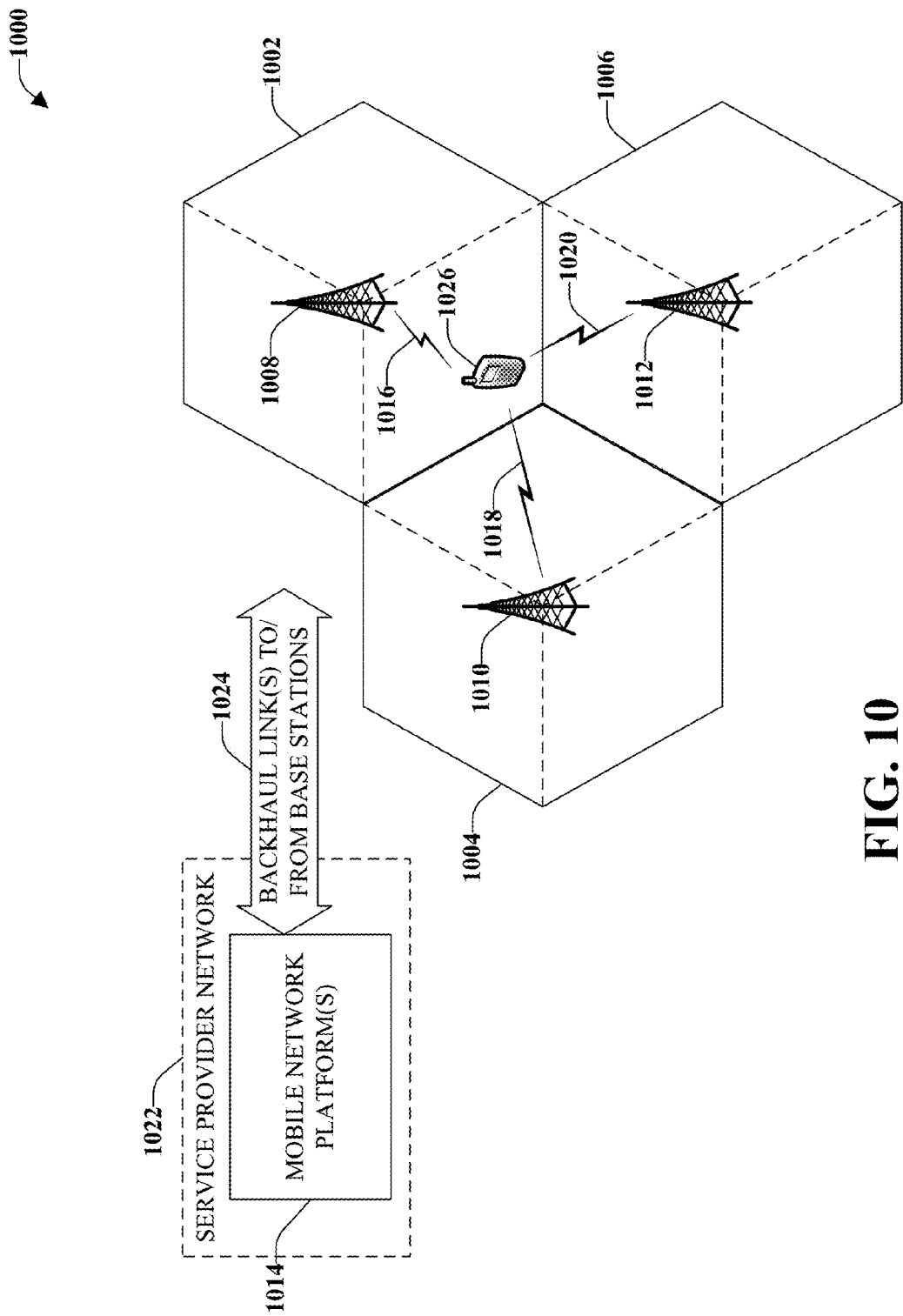
FIG. 10 illustrates a schematic example wireless environment that can operate in accordance with aspects described herein.

By way of further description with respect to one or more non-limiting ways to detect a faulty oscillator and/or to detect faulty mobile timing measurements, FIG. 10 is a schematic example wireless environment 1000 that can operate in accordance with aspects described herein. In particular, example wireless environment 1000 illustrates a set of wireless network macro cells. Three coverage macro cells 1002, 1004, and 1006 include the illustrative wireless environment; however, it is noted that wireless cellular network deployments can encompass any number of macro cells. Coverage macro cells 1002, 1004, and 1006 are illustrated as hexagons; however, coverage cells can adopt other geometries generally dictated by a deployment configuration or floor plan, geographic areas to be covered, and so on. Each macro cell 1002, 1004, and 1006 is sectorized in a $2\pi/3$ configuration in which each macro cell includes three sectors, demarcated with dashed lines in FIG. 10. It is noted that other sectorizations are possible, and aspects or features of the disclosed subject matter can be exploited regardless of type of sectorization. Macro cells 1002, 1004, and 1006 are served respectively through base stations or eNodeBs 1008, 1010, and 1012. Any two eNodeBs can be considered an eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1014, and set of base stations (e.g., eNode B 1008, 1010, and 1012) that serve a set of macro cells; electronic circuitry or components associated with the base stations in the set of base stations; a set of respective wireless links (e.g., links 1016, 1018, and 1020) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 1016, 1018, and 1020 embody a Uu interface (UMTS Air Interface).

Mobile network platform(s) 1014 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 1022 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1014 can control and manage base stations 1008, 1010, and 1012 and radio component(s) associated thereof, in disparate macro cells 1002, 1004, and 1006 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 1014 can be embodied in the service provider network 1022.

In addition, wireless backhaul link(s) 1024 can include wired link components such as T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1024 embodies IuB interface.

It is noted that while example wireless environment 1000 is illustrated for macro cells and macro base stations, aspects, features and advantages of the disclosed subject matter can be implemented in microcells, picocells, femto cells, or the like, wherein base stations are embodied in home-based equipment related to access to a network.

Figure 11:
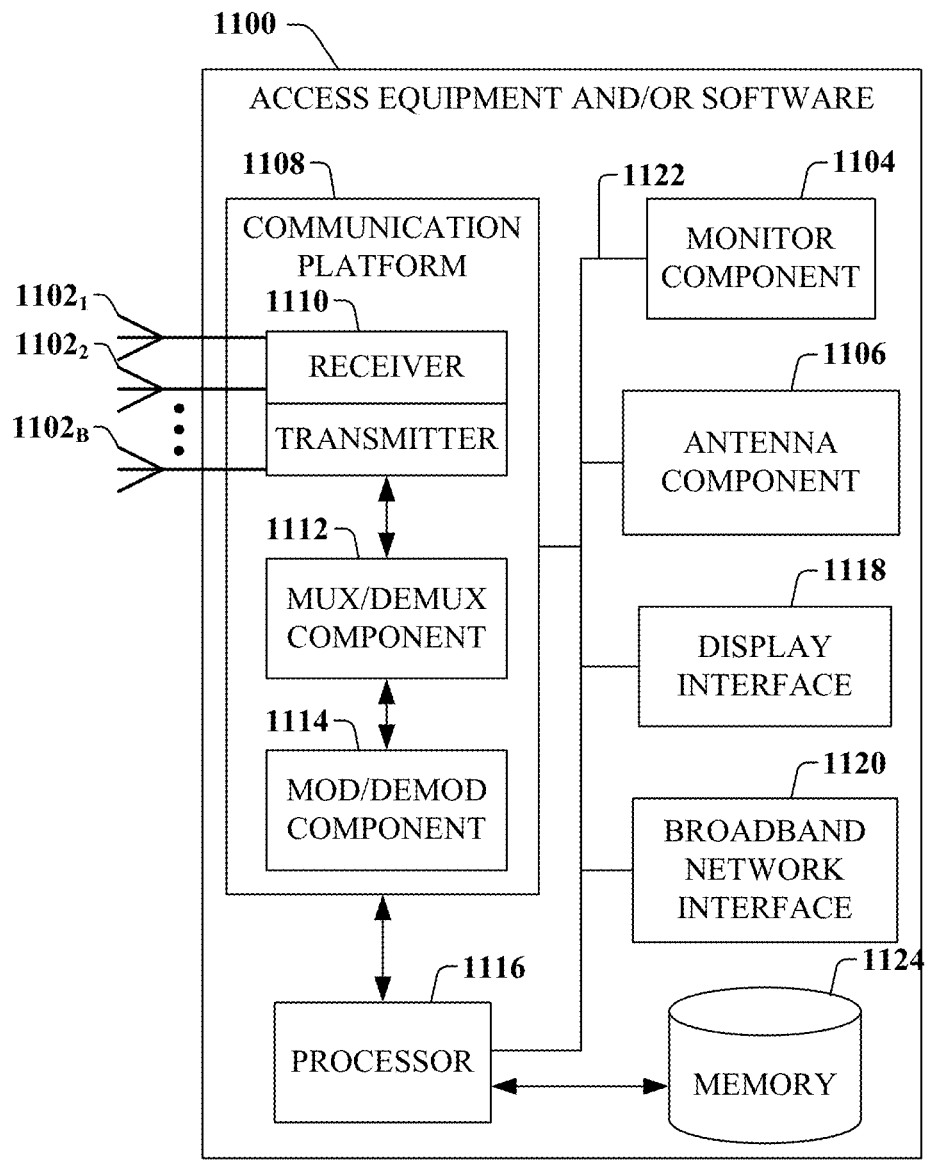
FIG. 11 illustrates a block diagram of access equipment and/or software related to access of a network, in accordance with an embodiment.

To provide further context for various aspects of the disclosed subject matter, FIG. 11 illustrates a block diagram of an embodiment of access equipment and/or software 1100 related to access of a network (e.g., base station, wireless access point, femtocell access point, and so forth) that can enable and/or exploit features or aspects of the disclosed aspects.

Access equipment and/or software 1100 related to access of a network can receive and transmit signal(s) from and to wireless devices, wireless ports, wireless routers, etc. through segments $1102_1$-$1102_B$ (B is a positive integer). Segments $1102_1$-$1102_B$ can be internal and/or external to access equipment and/or software 1100 related to access of a network, and can be controlled by a monitor component 1104 and an antenna component 1106. Monitor component 1104 and antenna component 1106 can couple to communication platform 1108, which can include electronic components and associated circuitry that provide for processing and manipulation of received signal(s) and other signal(s) to be transmitted.

In an aspect, communication platform 1108 includes a receiver/transmitter 1110 that can convert analog signals to digital signals upon reception of the analog signals, and can convert digital signals to analog signals upon transmission. In addition, receiver/transmitter 1110 can divide a single data stream into multiple, parallel data streams, or perform the reciprocal operation. Coupled to receiver/transmitter 1110 can be a multiplexer/demultiplexer 1112 that can facilitate manipulation of signals in time and frequency space. Multiplexer/demultiplexer 1112 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 1112 can scramble and spread information (e.g., codes, according to substantially any code known in the art, such as Hadamard-Walsh codes, Baker codes, Kasami codes, polyphase codes, and so forth).

A modulator/demodulator 1114 is also a part of communication platform 1108, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 1100 related to access of a network also includes a processor 1116 configured to confer, at least in part, functionality to substantially any electronic component in access equipment and/or software 1100. In particular, processor 1116 can facilitate configuration of access equipment and/or software 1100 through, for example, monitor component 1104, antenna component 1106, and one or more components therein. Additionally, access equipment and/or software 1100 can include display interface 1118, which can display functions that control functionality of access equipment and/or software 1100, or reveal operation conditions thereof. In addition, display interface 1118 can include a screen to convey information to an end user. In an aspect, display interface 1118 can be an LCD (Liquid Crystal Display), a plasma panel, a monolithic thin-film based electrochromic display, and so on. Moreover, display interface 1118 can include a component (e.g., speaker) that facilitates communication of aural indicia, which can also be employed in connection with messages that convey operational instructions to an end user. Display interface 1118 can also facilitate data entry (e.g., through a linked keypad or through touch gestures), which can cause access equipment and/or software 1100 to receive external commands (e.g., restart operation).

Broadband network interface 1120 facilitates connection of access equipment and/or software 1100 to a service provider network (not shown) that can include one or more cellular technologies (e.g., 3GPP UMTS, GSM, and so on.) through backhaul link(s) (not shown), which enable incoming and outgoing data flow. Broadband network interface 1120 can be internal or external to access equipment and/or software 1100, and can utilize display interface 1118 for end-user interaction and status information delivery.

Processor 1116 can be functionally connected to communication platform 1108 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1116 can be functionally connected, through data, system, or an address bus 1122, to display interface 1118 and broadband network interface 1120, to confer, at least in part, functionality to each of such components.

In access equipment and/or software 1100, memory 1124 can retain location and/or coverage area (e.g., macro sector, identifier(s)), access list(s) that authorize access to wireless coverage through access equipment and/or software 1100, sector intelligence that can include ranking of coverage areas in the wireless environment of access equipment and/or software 1100, radio link quality and strength associated therewith, or the like. Memory 1124 also can store data structures, code instructions and program modules, system or device information, code sequences for scrambling, spreading and pilot transmission, access point configuration, and so on. Processor 1116 can be coupled (e.g., through a memory bus) to memory 1124 in order to store and retrieve information used to operate and/or confer functionality to the components, platform, and interface that reside within access equipment and/or software 1100.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1124, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 12:
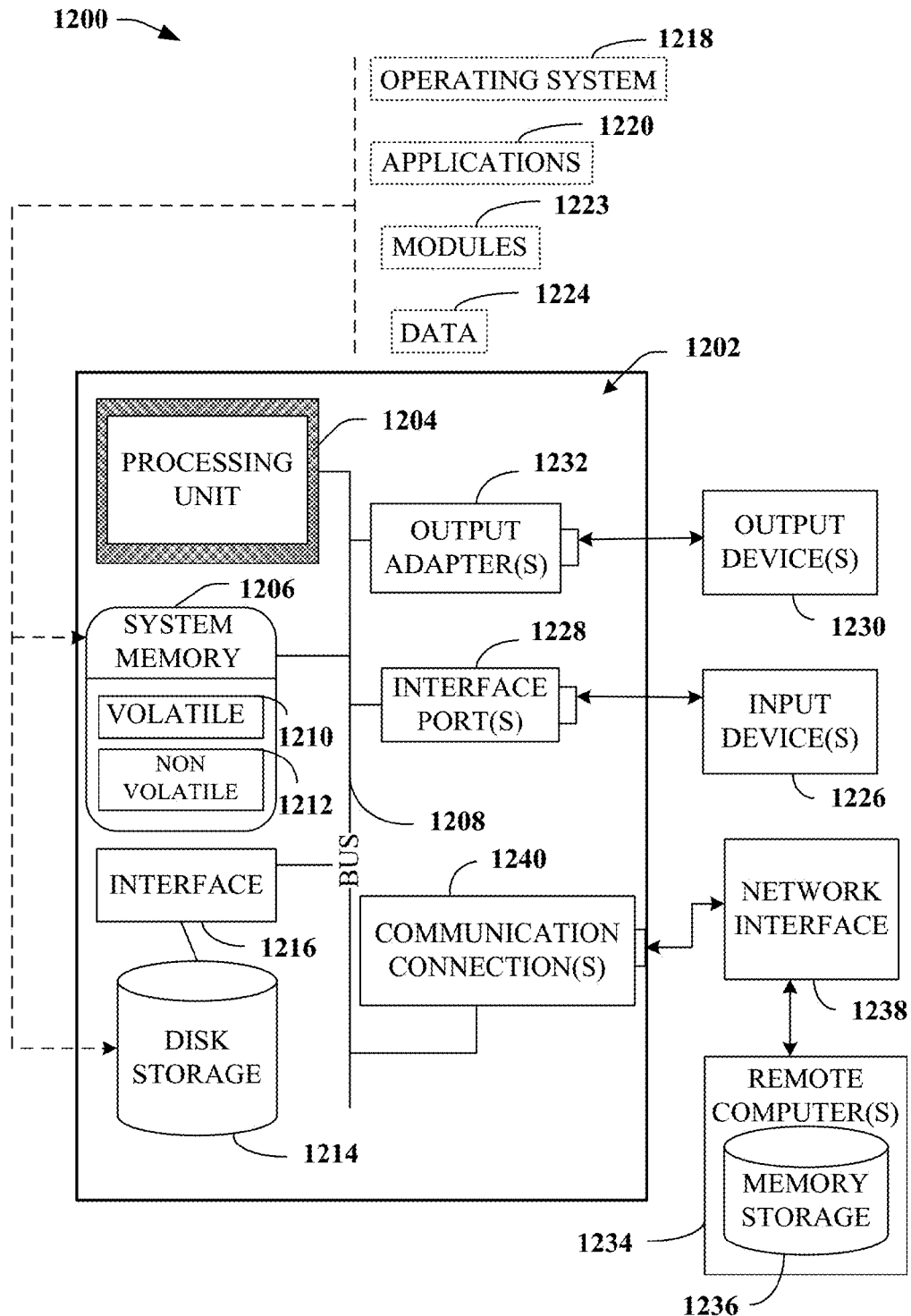
FIG. 12 illustrates a block diagram of a computing system, in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 202) there can be software, which can instruct a processor (such as processor 204) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1202 includes a processing unit 1204, a system memory 1206, and a system bus 1208. System bus 1208 couples system components including, but not limited to, system memory 1206 to processing unit 1204. Processing unit 1204 can be any of various available processors. Dual microprocessors and other multiprocessor architectures also can be employed as processing unit 1204.

System bus 1208 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1206 includes volatile memory 1210 and nonvolatile memory 1212. A basic input/output system (BIOS), containing routines to transfer information between elements within computer 1202, such as during start-up, can be stored in nonvolatile memory 1212. By way of illustration, and not limitation, nonvolatile memory 1212 can include ROM, PROM, EPROM, EEPROM, or flash memory. Volatile memory 1210 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1202 also includes removable/non-removable, volatile/non-volatile computer storage media. In an implementation, the non-transitory computer-readable storage medium can store computer-executable instructions that, in response to execution, cause a system including a processor to perform operations. The operations can include storing a first set of observed time difference measurements received from a first user device and associated with a reported location of the first user device, a second set of observed time difference measurements received from a second user device and associated with a reported location of the second user device, and a third set of observed time difference measurements received from a third user device and associated with a reported location of the third user device. The operations can also include comparing pairs of sectors identified in the first, second, and third set of observed time difference measurements. The pairs of sectors have at least one common sector. The operations can also include detecting a faulty radio oscillator for at least one of the sectors of the pairs of sectors based in part on the comparison.

In an aspect, the operations can also include receiving primary scrambling codes for time difference measurements included in the first, second, and third sets of observed time difference measurements and determining pairs of sectors based on primary scrambling codes and the reported locations of the first, second, and third user devices.

In another aspect, the operations can include receiving international mobile subscriber identities of the first, second, and third user devices and determining mobile types of the first, second, and third user devices based on the international mobile subscriber identities. Further to this aspect, comparing the pairs of sectors comprises using timing measurements from at least two user devices of the first, second, and third user devices that are of different mobile types.

The operations, according to another aspect can include performing outlier detection to determine that the first set of observed time difference measurements are faulty. After determining the first set of observed time difference measurements are faulty, the operations can include ignoring the first set of observed time difference measurements in connection with comparing the pairs of sectors.

FIG. 12 illustrates the removable/non-removable, volatile/non-volatile computer storage media as, for example, disk storage 1214. Disk storage 1214 includes, but is not limited to, devices such as a magnetic disk drive, floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1214 to system bus 1208, a removable or non-removable interface is typically used, such as interface component 1216.

It is to be noted that FIG. 12 describes software that acts as an intermediary between users and computer resources described in suitable operating environment. Such software includes an operating system 1218. Operating system 1218, which can be stored on disk storage 1214, acts to control and allocate resources of computer system 1202. System applications 1220 can take advantage of the management of resources by operating system 1218 through program modules 1222 and program data 1224 stored either in system memory 1206 or on disk storage 1214. It is to be understood that the disclosed subject matter can be implemented with various operating systems or combinations of operating systems.

A user can enter commands or information, for example through interface component 1216, into computer system 1202 through input device(s) 1226. Input devices 1226 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1204 through system bus 1208 through interface port(s) 1228. Interface port(s) 1228 include, for example, a serial port, a parallel port, a game port, and a universal serial bus (USB). Output device(s) 1230 use some of the same type of ports as input device(s) 1226.

Thus, for example, a USB port can be used to provide input to computer 1202 and to output information from computer 1202 to an output device 1230. Output adapter 1232 is provided to illustrate that there are some output devices 1230, such as monitors, speakers, and printers, among other output devices 1230, which use special adapters. Output adapters 1232 include, by way of illustration and not limitation, video and sound cards that provide means of connection between output device 1230 and system bus 1208. It is also noted that other devices and/or systems of devices provide both input and output capabilities such as remote computer(s) 1234.

Computer 1202 can operate in a networked environment using logical connections to one or more remote computers, such as remote computer(s) 1234. Remote computer(s) 1234 can be a personal computer, a server, a router, a network PC, a workstation, a microprocessor based appliance, a peer device, or other common network node and the like, and typically includes many or all of the elements described relative to computer 1202.

For purposes of brevity, only one memory storage device 1236 is illustrated with remote computer(s) 1234. Remote computer(s) 1234 is logically connected to computer 1202 through a network interface 1238 and then physically connected through communication connection 1240. Network interface 1238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1240 refer(s) to hardware/software employed to connect network interface 1238 to system bus 1208. While communication connection 1240 is shown for illustrative clarity inside computer 1202, it can also be external to computer 1202. The hardware/software for connection to network interface 1238 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., through access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system comprising:
   a processor; and
   a memory that stores executable instructions that, when executed by the processor, facilitate performance of operations, comprising:
      receiving information related to base station radio pairs comprising a first base station radio pair that further comprises a first base station radio and a second base station radio, and a second base station radio pair that further comprises a third base station radio; and
      determining a first likelihood that a suspect radio of the base station radio pairs comprises an unstable radio oscillator via elimination of another base station radio of the base station radio pairs that is determined to satisfy a rule related to a second likelihood that the other base station radio is stable when not paired with the suspect radio and is determined to satisfy another rule related to a third likelihood that the other base station radio is unstable when paired with the suspect radio.

2. The system of claim 1, wherein the operations further comprise:
   receiving timing information comprising a first timing measurement related to the first base station radio pair; and
   in response to determining the first base station radio is associated with an expected timing measurement to within a determined tolerance, designating the first base station radio as operable.

3. The system of claim 2, wherein the operations further comprise:
   determining a measured time value based on the timing information;
   determining a calculated time value based on geographic information related to a location of the first base station radio;
   determining a delay value based on the measured time value and the calculated time value; and
   in response to determining that the delay value satisfies a rule related to an expected delay, identifying the suspect radio.

4. The system of claim 2, wherein the operations further comprise associating a primary scrambling code with a first timing measurement.

5. The system of claim 1, wherein the operations further comprise:
   identifying, at a first time, a first fixed reference based on a first location of the first base station radio; and
   storing the first fixed reference with timing information corresponding to the first time.

6. The system of claim 1, wherein the operations further comprise:
   in response to determining that a timing measurement related to the first base station radio pair is an outlier based on another timing measurement related to the second base station radio pair, marking the timing measurement as unreliable information.

7. The system of claim 1, wherein the receiving the information comprises receiving a radio resource measurement report comprising a first timing measurement related to the first base station radio pair, and a second timing measurement related to the second base station radio pair.

8. The system of claim 1, wherein the receiving the information comprises receiving a first radio resource measurement report comprising a first timing measurement related to the first base station radio pair, and receiving a second radio resource measurement report comprising a second timing measurement related to the second base station radio pair.

9. The system of claim 1, wherein the operations further comprise initiating an alert in response to satisfying a rule related to the first likelihood the suspect radio comprises an unstable radio oscillator.

10. The system of claim 1, wherein the operations further comprise:
    receiving type information indicating a type of mobile device employed in capturing a portion of the information related to the base station radio pairs, and
    wherein the determining the first likelihood that the suspect radio of the base station radio pairs comprises the unstable radio oscillator is further based on the type of mobile device used to capture the portion of the information.

11. A method, comprising:
    receiving, by a system comprising a processor, information comprising time information associated with at least three base station radios; and
    determining, by the system, a likelihood that a suspect radio of the at least three base station radios comprises an unstable radio oscillator in response to another base station radio of the at least three base station radios being determined to satisfy a rule related to the other base station radio being stable when not paired with the suspect radio and being unstable when paired with the suspect radio.

12. The method of claim 11, wherein the receiving the information comprises receiving a report comprising a timing measurement and a primary scrambling code associated with a base station radio of the at least three base station radios, and wherein the timing measurement and the primary scrambling code are determined by a mobile device.

13. The method of claim 12, wherein the report further comprises radio model identification information for a radio of the mobile device, and wherein the determining the likelihood that the suspect radio of the at least three base station radios comprises the unstable radio oscillator is further based on information related to the radio model derived from the radio model identification information.

14. The method of claim 11, further comprising, initiating an alert in response to the likelihood being determined to satisfy another rule related to a level of confidence that a radio oscillator is unstable.

15. The method of claim 11, wherein the receiving information comprises receiving a time value used to determine an observed time difference for a base station radio pair of the at least three base station radios.

16. The method of claim 15, further comprising:
   determining, by the system, that the time value associated with the determining the observed time difference is an anomalous timing measurement; and
   flagging, by the system, the time value as anomalous to restrict use of the time value in the determining the likelihood that the suspect radio comprises the unstable radio oscillator.

17. A non-transitory machine-readable storage medium, comprising executable instructions that, when executed by a processor, facilitate performance of operations, comprising: receiving information captured by a mobile device, wherein the information comprises time information associated with base station radios comprising a first, second, and third base station radio; and determining a likelihood that a suspect radio of the base station radios comprises an underperforming radio oscillator in response to another base station radio of the base station radios being determined to be stable when not paired with the suspect radio and to be unstable when paired with the suspect radio.

18. The machine-readable storage medium of claim 17, wherein the operations further comprise:
   receiving a primary scrambling code for the first base station radio; and
   determining a pair of the base station radios comprising the first base station radio based on the primary scrambling code and a corresponding location for the first base station radio.

19. The machine-readable storage medium of claim 18, wherein the operations further comprise:
   determining a radio type of a radio of the mobile device in response to receiving an international mobile subscriber identity associated with the mobile device; and
   wherein the determining the likelihood that the suspect radio of the base station radios comprises the underperforming radio oscillator is further based on the radio type.

20. The machine-readable storage medium of claim 17, wherein the operations further comprise:
   in response to determining the time information comprises an outlier time value, ignoring the outlier time value in the determining the likelihood that the suspect radio of the base station radios comprises the underperforming radio oscillator.

* * * * *